Patented May 1, 1923.

1,453,789

UNITED STATES PATENT OFFICE.

GAIL J. FINK, OF NIAGARA FALLS, NEW YORK, AND EDMUND DUNCAN GIAUQUE, OF NIAGARA FALLS, ONTARIO, CANADA, ASSIGNORS TO HOOKER ELECTROCHEMICAL COMPANY, OF NEW YORK, N. Y., A CORPORATION OF NEW YORK.

PREPARATION OF PURE SELENIUM OXYCHLORIDE.

No Drawing.   Application filed January 27, 1921. Serial No. 440,494.

*To all whom it may concern:*

Be it known that we, (1) GAIL J. FINK and (2) EDMUND DUNCAN GIAUQUE, citizens of (1) the United States and (2) the United States, residing at (1) Niagara Falls, (2) Niagara Falls, in the county of (1) Niagara, (2) Province of Ontario, and State of (1) New York, (2) Dominion of Canada, have invented certain new and useful Improvements in the Preparation of Pure Selenium Oxychloride, of which the following is a specification.

This invention is a novel method whereby commercially pure and light-colored selenium oxychloride may be obtained form impure starting materials, the latter comprising either crude selenium oxychloride, or an impure selenium-bearing material such as a mixture of crude selenium and selenium oxid.

Selenium oxychloride is a volatile liquid of pale yellow color, which is ordinarily prepared by the reaction of selenium tetrachlorid upon selenium oxid. The crude oxychloride is red or brown in color, being contaminated by dark colored chlorids of selenium. The isolation of the substantially pure oxychloride by fractional distillation at normal or reduced pressures is difficult if not impossible, the fractions or certain of the fractions being almost invariably discolored. This discoloration is attributed principally to selenium monochlorid, which is one of the products of decomposition of selenium oxychloride under the distilling conditions, and which has a vapor tension above that of the oxychloride and therefore imparts its red or brown color to the distillate.

According to our researches, selenium oxychloride tends, at the distilling temperature under normal or lower pressures, to undergo decomposition yielding a complex of which the principal components appear to be selenium monochlorid, selenium tetrachlorid, selenium oxid and chlorin. While the exact composition of the mixture will of course vary according to the particular equilibrium conditions, the changes involved may perhaps be indicated as follows:

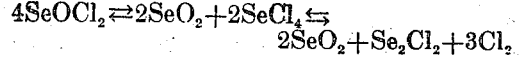
$$4SeOCl_2 \rightleftarrows 2SeO_2 + 2SeCl_4 \rightleftarrows$$
$$2SeO_2 + Se_2Cl_2 + 3Cl_2$$

We have found that this tendency to decomposition, proceeding from left to right in the above equation, may be prevented by carrying out the distillation in an atmosphere of dry chlorin. This may be accomplished by passing a stream of chlorin through the selenium oxychloride during the distilling process, or in any other desired way, as for example, by carrying out the distillation in a chlorin atmosphere. By so proceeding, light-colored commercially pure selenium oxychloride may be prepared in a single operation from the crude and discolored initial product. Any free chlorin dissolved in the distillate may be readily removed, for example by passing through it a current of air or other inert gas.

As a modification of the invention we are able to prepare a light-colored selenium oxychloride by direct distillation from the vessel or reactor in which crude selenium-bearing materials (preferably a mixture of selenium and selenium oxid in a bath of selenium oxychloride) are caused to react with chlorin, the precaution being observed to maintain an excess of chlorin during the reaction and also during the distillation which accompanies or follows the reaction.

We claim:—

1. Method of refining crude selenium oxychloride which consists in distilling the same in an atmosphere containing an excess of chlorin.

2. Method of preparing light-colored selenium oxychloride, from crude raw materials, comprising reacting with chlorin on a crude selenium-bearing material and distilling the product in an atmosphere containing an excess of chlorin.

In testimony whereof, we affix our signatures.

GAIL J. FINK.